United States Patent [19]

Franklin

[11] 4,251,084
[45] Feb. 17, 1981

[54] COLLETS

[75] Inventor: Reginald A. Franklin, Whitney, England

[73] Assignee: Crawford Collets Limited, England

[21] Appl. No.: 41,796

[22] Filed: May 23, 1979

[30] Foreign Application Priority Data

Jun. 21, 1978 [GB] United Kingdom ............... 27523/78

[51] Int. Cl.³ ............................................. B23B 31/20
[52] U.S. Cl. ................................ 279/1 ME; 279/1 Q; 279/55
[58] Field of Search ............... 279/1 ME, 1 Q, 55, 56, 279/57, 58, 59, 60, 64, 46

[56] References Cited

U.S. PATENT DOCUMENTS

| 2,346,706 | 4/1944 | Stoner | 279/46 |
| 2,557,301 | 6/1951 | Lundy | 279/1 ME |

Primary Examiner—Z. R. Bilinsky

[57] ABSTRACT

A collet is composed of a number of segments each separated from an adjacent segment by means of a resilient plate-like separator which is connected to the two adjacent segments. The opposed faces of the separator contact opposed radial side surfaces of the adjacent segments and in order to increase the resilience of the segments, and thus to decrease the force required to close the collet, the faces of the separators are ribbed in a grid-like pattern. The separators permit the internal diameter of the collet to be varied to suit a range of workpiece diameters, while maintaining a parallel grip.

2 Claims, 4 Drawing Figures

COLLETS

BACKGROUND OF THE INVENTION

1. Field of the Invention

The present invention relates to collets, and more particularly to collets which can be adjusted to accommodate workpieces of different diameters within a specific range of diameters.

2. Description of the Prior Art

Conventional machine tool collets are adjustable in internal diameter in order to grip and release a workpiece, but the adjustment is such that each collet is only suitable for use with a specific diameter of workpiece which the collet grips along the entire length of its gripping segments. This gripping action can only be achieved with one specific workpiece diameter, and therefore a different collet is required for workpieces of different diameter.

There has been disclosed in U.S. Pat. No. 2,346,706 issued to Stoner, a collet which can be adjusted to accommodate workpieces of diameters within a specific range. In certain embodiments this collet consists of separate segments with rubber plate-like elements interposed between adjacent segments. The faces of the rubber elements are adhered to the opposed radial faces of the adjacent segments or have projections which engage in recesses in the opposed faces of adjacent segments. The segments of the collet can be moved inwardly to clamp different diameters of workpiece, but due to the connection between the rubber elements and the faces of the segments, the rubber elements provide substantial resistance to inwards movement of the segments which, in effect, absorbs much of the closure force applied to the collet by an associated closure mechanism.

U.S. Pat. No. 2,557,301 issued to Lundy discloses a collet with rubber-like inserts between adjacent segments. The inserts have a ribbed construction in one embodiment, with the ribs in contact with the adjacent radial faces of the segments. These inserts act simply as seals. The segments are not separate segments, so that this collet is not adjustable for different workpiece diameters. Similar sealing inserts are disclosed in U.S. Pat. Nos. 3,539,193 and 3,669,462, both issued to Parsons.

British Pat. No. 1,245,418 issued to Fahrion teaches a collet with rubber plate-like inserts located between adjacent segments. Although this collet is disclosed as being adjustable to suit different clamping diameters, the segments are connected at their inner ends and are therefore not capable of displacement parallel to the axis of the collet. Instead, they would tend to pivot inwardly about their inner connected ends and would not be exactly parallel with the workpiece at different clamping diameters. Further, the radial dimensions of the inserts is substantially less than that of the segments, and gaps are left between the radially inner edges of the inserts and the segments. Particles of swarf are liable to enter these gaps, and this may impede correct functioning of the collet.

SUMMARY OF THE INVENTION

According to the invention, there is provided in a collet, a plurality of separate jaw-like segments, each segment having substantially radial faces spaced from the adjacent radial face of each adjacent segment, and a resilient plate-like separator located in the space between adjacent segments, said separator having opposed faces in engagement with the adjacent faces of the adjacent segments, the opposed faces of each separator being of ribbed construction, and each separator being attached to its associated segments so that the separator is resiliently deformed when a closing force is applied to the collet and exerts a bias which tends to restore the collet to its open condition when the closing force is removed.

Further according to the invention, there is provided in a collet, a series of separate segments arranged in an annular array, each segment having substantially radial plane faces spaced from the adjacent radial face of the adjacent segments to define a gap, and a rubber-like separator located in each said gap, each separator being of plate-like form and having opposed faces in engagement with the radial faces of the adjacent segments, each said face of the separator comprising ribs arranged in a mutually intersecting array to form a grid-like pattern, each said separator extending over a substantial portion of the radial length of each said gap and having a radial inner end which lies adjacent the radially inner end of the gap to substantially prevent the entry of swarf, and each said separator having a head part attached to the adjacent segments.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENTS

Figure 1:
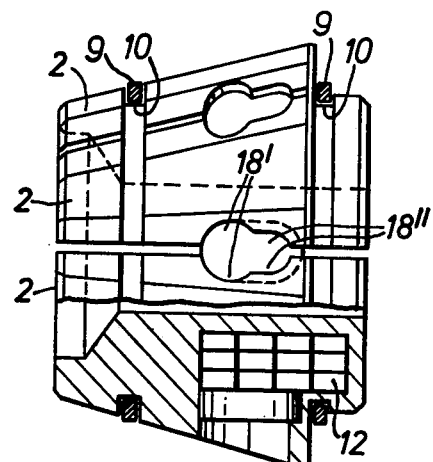
FIG. 1 is an elevation, partially in section, of a collet in accordance with the invention.
Figure 3:
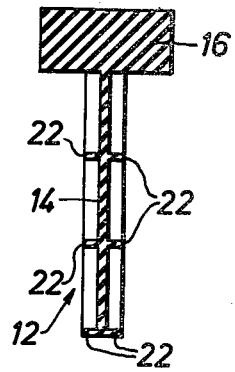
FIG. 3 is a section through the separator element, taken on line III—III of FIG. 2.
Figure 2:
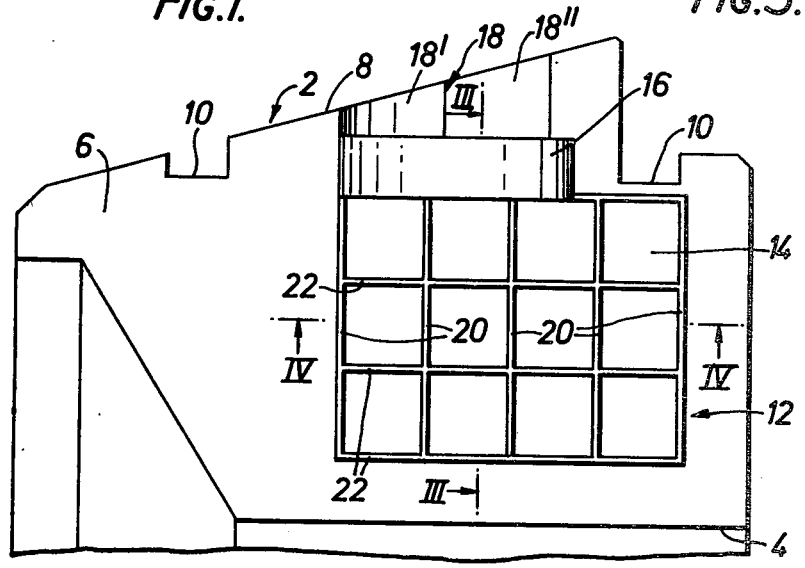
FIG. 2 is a side elevation showing a segment of the collet and a separator element arranged between adjacent segments.

The collet shown in the drawings is primarily intended for holding a workpiece during a machining operation and comprises a series of separate wedge-like jaws or segments 2 arranged in an annular array. Each segment 2 has an inner surface 4 extending parallel to the axis of the array, two plane radially-directed side surfaces 6, and an arcuate outer surface 8 inclined to the axis of the array. The outer surfaces 8 of the segments 2 collectively define a generally frusto-conical surface which, in use of the collet, lies within an inner frusto-conical surface of a chuck or similar component such that relative axial movement between these two surfaces effects radially inwards or outwards movement of the segments. The segments 2 are held in the annular array by means of split or solid circlips 9 located within annular grooves 10 formed on the outer surface of the collet.

The inner surfaces 4 of the segments 2 collectively define an inner bore which receives the workpiece. The inner surface 4 of each segment 2 may be of arcuate form in order to define a cylindrical inner bore. Alternatively, the inner surface 4 of each segment 2 may be plane to define an inner bore of polygonal cross-section; according to the number of such segments 2, the bore may be of square or hexagonal cross-section, for example.

Figure 4:
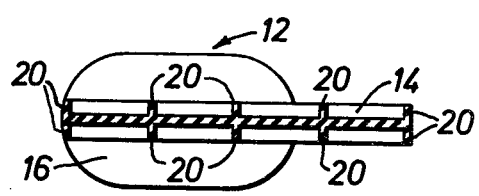
FIG. 4 is a section through the separator element taken on line IV—IV of FIG. 2.

The segments 2 are retained at a uniform spacing within the array by means of resilient separator elements 12 located between each pair of adjacent segments 2. Preferably, the separator elements are composed of a synthetic rubber, for example ACRYLIC K1589. Each separator element 12 comprises a main plate-like part 14 positioned between, and in contact with, the adjacent side surfaces 6 of the segments 2, with the two faces of the plate-like part 14 facing the respective side surfaces 6 of the two segments 2. In order to secure the separator element 14 relative to the segments 2, the element 14 has an enlarged head part 16 at its outer radial end. The head part 16 is engaged in co-operating recesses 18 formed in the two segments 2, each recess opening onto the side surface 6 of the segment 2. More particularly, as shown in FIG. 4, the head part 16 of the separator element 12 is of semi-circular form at each end portion and has rectilinear sides extending between the end portions. The recess 18 in the segment 2, is formed at the side edge portion of the segment 2 and extends from the outer surface 8 of the segment 2. One part 18' of the recess 18 is of arcuate form with a diameter substantially equal to that of the semi-circular end portions of the head part 16, the other part 18" of the recess being of reduced size at the outer surface of the segment 2 and being undercut to a size equivalent to that of the first part 18' of the recess 18. The two adjacent recesses 18 of each pair of segments co-operate to define a slot of approximately "keyhole" form as is shown in FIG. 1. The head part 16 of the element 12 is located within the slot, with one end portion of the head part 16 being retained within the undercut portions of the slot to prevent inadvertent removal.

Each face of the plate-like part 14 of the element 12 is formed with a series of integral, mutually perpendicular, ribs 20, 22 arranged in a grid-like formation to respectively extend radially and longitudinally of the array and act to increase the effective resilience of the element 12. This facilitates radial displacement of the segments 2 in a sense to grip a workpiece within the bore without absorbing a significant part of the holding or closure force applied to the collet by the associated closure mechanism. By virtue of their resilience, the elements 12 also act as springs to facilitate the release of the segments 2 from the workpiece when the closure force is removed.

The separator elements 12 extend along a substantial part of the effective radial depth of the segments and their inner radial ends lie adjacent to the inner periphery of the collet. When the collet is closed the inner ends tend to migrate further towards the inner periphery of the collet and effectively prevent ingress of swarf into the radial gaps which would otherwise exist between adjacent segments. The substantial radial extent of the separators also prevents collet distortion due to twisting of the segments when a torque is applied to a workpiece held within the collet.

The resilient separator elements 12 in the form described, permit the collet to effectively clamp workpieces having a diameter which varies within a predetermined range from a given nominal size. The segments 2 grip the workpiece along their length, the inner gripping surfaces of the segments remaining parallel with the workpiece, irrespective of the workpiece diameter.

Although the collet is primarily intended for holding a workpiece, it may also be used for holding a machining tool.

What is claimed is:

1. In a collet a plurality of separate jaw-like segments, each segment having substantially radial faces spaced from the adjacent radial face of each adjacent segment, and a resilient plate-like separator located in the space between adjacent segments, said separator having opposed faces in engagement with the adjacent faces of the adjacent segments, the opposed faces of each separator being of ribbed construction with a grid-like arrangement of ribs, the ribs extending axially and radially of the collet, and each separator having a head part at its radially outer end and being attached to its associated segments by means of the head part so that the separator is resiliently deformed when a closing force is applied to the collet and exerts a bias which tends to restore the collet to its open condition when the closing force is removed, the adjacent segments having means defining undercut recesses, and the head part of each said separator being located in the undercut recesses formed in the adjacent segments.

2. In a collet, a series of separate segments arranged in an annular array, each segment having substantially radial plane faces spaced from the adjacent radial face of the adjacent segments to define a gap, and a rubber-like separator located in each said gap, each separator being of plate-like form and having opposed faces in engagement with the radial faces of the adjacent segments, each said face of the separator comprising ribs arranged in a mutually intersecting array to form a grid-like pattern, each said separator extending over a substantial portion of the radial length of each said gap and having a radial inner end which lies adjacent the radially inner end of the gap to substantially prevent the entry of swarf, and each said separator having a head part attached to the adjacent segments.

* * * * *